(No Model.)　　　　　　F. J. MATHEIN.　　　2 Sheets—Sheet 1.
PHOTOGRAPHIC SHUTTER.
No. 534,337.　　　　　　　　　　Patented Feb. 19, 1895.
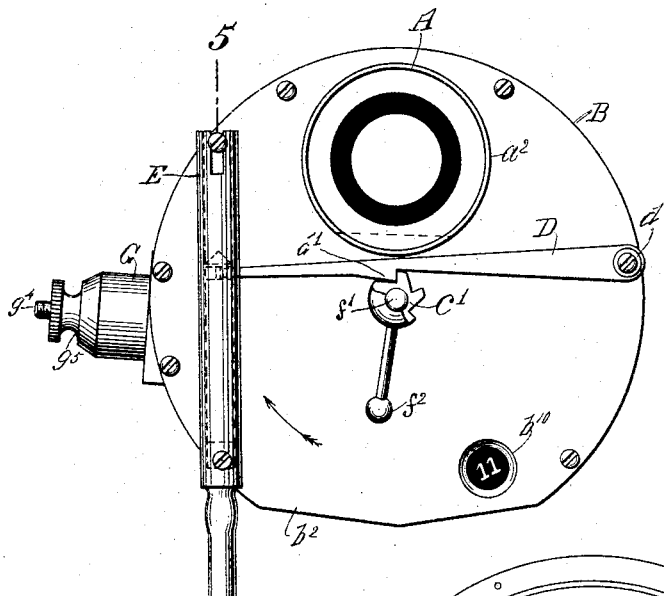
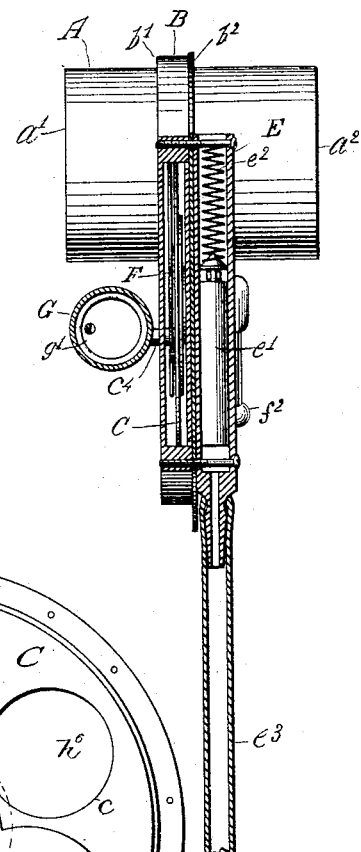
Witnesses:-　　　　　　　　　　Inventor:-
　　　　　　　　　　　　　Franz Josef Mathein
　　　　　　　　　　　　　By his attorney (No Model.) 2 Sheets—Sheet 2.
F. J. MATHEIN.
PHOTOGRAPHIC SHUTTER.
No. 534,337. Patented Feb. 19, 1895.
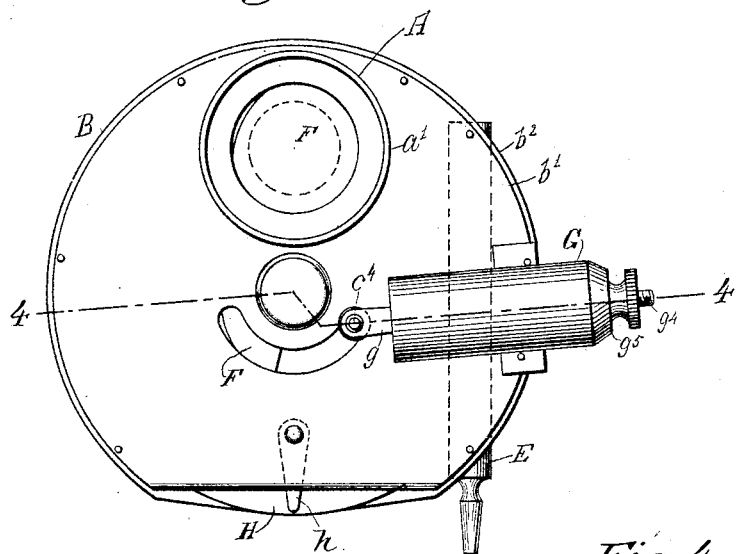
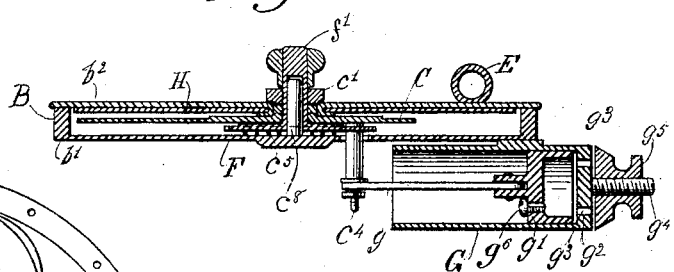
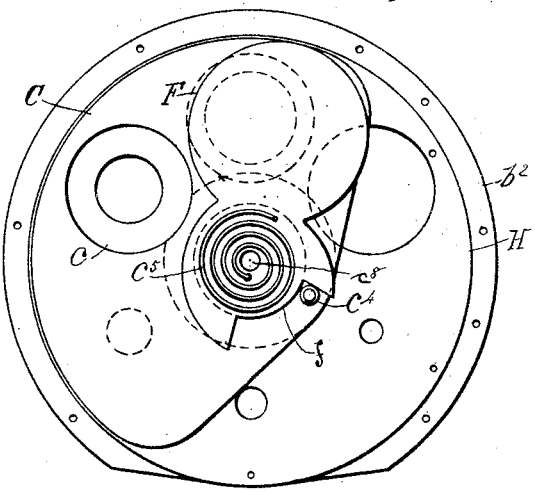
Witnesses:—
Inventor:—
Franz Josef Mathein
By his attorney
Edwin H. Brown

UNITED STATES PATENT OFFICE.

FRANZ J. MATHEIN, OF NEW HAVEN, CONNECTICUT, ASSIGNOR TO THE SCOVILL & ADAMS COMPANY, OF NEW YORK, N. Y.

PHOTOGRAPHIC SHUTTER.

SPECIFICATION forming part of Letters Patent No. 534,337, dated February 19, 1895.

Application filed June 23, 1893. Serial No. 478,560. (No model.)

*To all whom it may concern:*

Be it known that I, FRANZ JOSEF MATHEIN, of New Haven, in the State of Connecticut, have invented a new and useful Improvement in Photographic Shutters, of which the following is a specification.

I will describe a shutter mechanism embodying my improvement and then point out the novel features in the claims.

In the accompanying drawings, Figure 1 is a front view of a shutter mechanism embodying my improvement. Fig. 2 is a back view. Fig. 3 is a back view with the rear plate of the box and certain parts mounted thereon removed, the shutter being shown as set. Fig. 4 is an irregular transverse section taken on the plane of line 4 4 of Fig. 2. Fig. 5 is a section taken on the plane of line 5 5 of Fig. 1. Fig. 6 is a view similar to Fig. 3, after the shutter has been released.

Similar letters of reference designate corresponding parts in all the figures.

A designates the lens tube of a photographic camera.

B designates a shallow box formed of two parts $b'$, $b^2$, the former being made of a piece of sheet metal having a rim, and the latter being made in the form of a plate.

The lens tube A is shown as made in two parts $a'$, $a^2$, which are attached respectively to the parts $b'$ $b^2$ of the box B.

Within the box B is a shutter C. It will preferably be made of a disk segment of metal and is pivoted to a stud $c^3$ at the center of the box, so as to be capable of rotating. A spring $c^5$ rotates this shutter in one direction. It is provided with a hole $c$ which on the rotation of the shutter may pass into the lens tube. Ordinarily the imperforate portion of the shutter will be opposite the lens tube and the shutter will be locked in this position by means of a detent consisting of a lever D, pivoted by a pin or screw $d$ to the front plate $b^2$ of the box B. This lever is provided with a tooth $d'$ which is capable of engaging with one of several teeth, formed upon a hub $c'$ affixed to the shutter C so as to rotate therewith. The shutter will be rotated to set it, and, according to the distance it is rotated, one or the other of the teeth on such hub $c'$ will be engaged with the detent. The free end of the lever constituting the detent extends into a slot formed lengthwise in a tube E. Within this tube, on one side of the lever is a piston $e'$ and on the other side a spring $e^2$. That portion of the tube E containing the piston $e'$ is, at the end, connected by a soft rubber pipe $e^3$, with a compression bulb $e^4$ of soft rubber. By compressing the bulb the piston may be made to disengage the detent from the shutter. Afterward the spring will return the detent to a position for re-engaging the shutter by means of one of the teeth upon the hub $c'$.

Adjacent to the shutter C and as here shown on the rear side thereof, is an auxiliary shutter F, which is pivoted concentrically with the shutter C. At one side of the pivot, it may be made only large enough to properly cover the opening $c$ of the shutter. At the other side of the pivot it need project but slightly. In the latter portion it is provided with a notch $f$ through which passes rearward a pin $c^4$ extending from the shutter C. The auxiliary shutter F is pivoted independently of the shutter C and has a hub $f'$ which extends through the hub of the shutter C, and also through the front plate $b^2$ of the box B. At the outer extremity it is provided with an arm $f^2$, it being in the present instance attached to a collar on said hub. The spring $c^5$ resists the movement of the auxiliary shutter in the direction indicated by the arrow marked on Fig. 1, and also is adapted to move the same in the reverse direction.

The shutter is set by moving the arm $f^2$ in the direction indicated by the arrow, Fig. 1. The first effect of moving the arm $f^2$ toward the tube E will be to shift the auxiliary shutter F into a position which will cause it to close the opening $c$ of the shutter C. The further movement of the arm $f^2$ will shift the shutter C so as to carry its opening $c$ past the lens tube, the movement being in the direction of the arrow marked on Fig. 1. When the shutter C has been shifted, it will be held by the detent D. When the arm $f^2$ is released, the spring $c^5$ will cause the auxiliary shutter F to move in the reverse direction to that indicated by the arrow in Fig. 1.

Upon the disengagement of the detent the spring combined with the shutter will move the shutter in the reverse direction to that indicated by the arrow in Fig. 1, and cause the opening $c$ of the shutter C to move past the lens tube A. The pin $c^4$ co-acting with the notch $f$ of the auxiliary shutter F limits the independent movements of this auxiliary shutter. The pin $c^4$ is connected by a link $g$ with the rod of a piston $g'$ fitted to a cylinder G mounted on the back plate $b'$ of the box B. At one end this cylinder is open. At the other end $g^2$ it is closed and in this end are small openings $g^3$. From this end extends a screw $g^4$ and fitted to this screw is a nut $g^5$ that may be adjusted along the screw toward and from the end of the cylinder so as to regulate the passage of air from the openings $g^3$. A screw $g^6$ may be used to adjust the size of an opening through the piston to assist in regulating the exit of air from the cylinder.

When the shutter C is released and moves under the impulse of its spring, it will force the piston $g'$ toward the end $g^2$ of the cylinder G, and, as the piston can only move in accordance with the freedom with which air will escape through the openings $g^3$ and the passage through the piston, it is obvious that the speed of the shutter may be varied by adjusting the nut $g^5$ so as to produce any desired exposure.

Adjacent to the shutter C, and on the forward side thereof, a disk H is arranged. It is pivoted concentrically with the shutter C and the auxiliary shutter F and may be adjusted by hand, inasmuch as its end projects through an opening in the box B, so that it may be reached. In this disk are a number of openings $N'$, $N^2$, $N^3$, $N^4$, $N^5$, and $N^6$ of different sizes, and they are arranged with their centers in a circle, that is, concentric with the pivot of the disk. The disk may be rotarily adjusted so as to bring any one of its openings opposite the lens tube A. This disk is a diaphragm plate, regulating the amount of light passing through the lens tube A. A spring $h'$ may be attached to the front plate $b^2$ of the box B and bent to press against the diaphragm plate H to hold the latter in an adjusted position.

In the front plate $b^2$ of the box B is an opening $b^{10}$ through which may be seen a number marked on the disk H. The numbers will enable a photographer to adjust the disk so as to bring any desired one of its openings opposite to the lens tube A.

In using the term "lens tube" in my specification and claims, I wish to include not only the lens tube proper but also any extension thereof.

Obviously the box B will be a support for the shutter and its appurtenances. I am unwilling to be confined to a shutter support made in the form of a box.

What I claim as my invention, and desire to secure by Letters Patent, is—

1. The combination with a lens tube, of a shutter having an opening and capable of being moved past the lens tube, a support for the shutter, an auxiliary shutter, a detent and a pneumatic retarder for the shutter, substantially as specified.

2. The combination with a lens tube, of a shutter having an opening and capable of being moved past the lens tube, a support for the shutter, an auxiliary shutter, a detent, a pneumatic retarder for the shutter, and means for adjusting the pneumatic retarder, substantially as specified.

3. The combination with a lens tube, of a shutter having an opening and capable of being moved past the lens tube, an auxiliary shutter for said opening, supports for said shutters, a detent and a pneumatic retarder connected with the shutter, substantially as specified.

4. The combination with a lens tube, of a shutter having an opening and capable of being moved past the lens tube, an auxiliary shutter for said opening, supports for said shutters, a detent, a pneumatic retarder connected with the shutter, and a handle for setting the shutter by setting the auxiliary shutter, substantially as specified.

5. The combination with a lens tube, of a shutter having an opening and capable of being moved past the lens tube, an auxiliary shutter for said opening, supports for said shutters, a detent, a pneumatic retarder connected with the shutter, a handle for setting the shutter by setting the auxiliary shutter, and a detent for holding the shutter after setting it, substantially as specified.

6. The combination with a lens tube, of a shutter having an opening and capable of being moved past the lens tube, a support for said shutter, an auxiliary shutter, a detent, a cylinder attached to the shutter support, a piston fitted to the cylinder and connected with the shutter, and a regulating valve for varying the escape of air from the cylinder, substantially as specified.

7. The combination with a lens tube, of a shutter having an opening and capable of being moved past the lens tube, a support for the shutter, a detent, a cylinder attached to the shutter support, a piston fitted to the cylinder and connected with a rod or pin rigidly secured to the shutter, a screw extending from one end of the cylinder, and a regulating valve made in the form of a nut applied to said screw and serving to control the passage of air from the cylinder, substantially as specified.

8. The combination with a lens tube, of a shutter, a detent attached to shutter, a detent lever for releasing the shutter when the latter is in its closed position, a tube into which said lever extends, a piston in said tube for operating said detent lever, and a spring for turning the piston to its normal position, substantially as specified.

9. The combination with a lens tube, of a shutter having an opening capable of being moved past the lens tube, an auxiliary shutter for covering the opening of said shutter, a support for the shutter, a spring applied to the auxiliary shutter for operating both shutters, a pin or stud having the auxiliary shutter affixed to it and extending through the shutter support to serve as a means for setting the shutter, a hub on the shutter and a spring-actuated detent for engaging with the hub on the shutter, said detent serving to hold the shutter against movement during the setting of the shutter until after the auxiliary shutter shall have moved far enough to cover the opening of said shutter, substantially as specified.

10. The combination with a lens tube and a shutter support, of a shutter, an auxiliary shutter, a single spring for operating both shutters and a pneumatic retarder for the shutter, substantially as specified.

11. The combination with a lens tube, of a shutter provided with an opening capable of being moved past the lens tube, an auxiliary shutter for closing the opening through said shutter, and a pin or rod attached to said shutter and projecting through a slot formed in the auxiliary shutter, substantially as specified.

In testimony whereof I have signed my name to this specification in the presence of two subscribing witnesses.

F. J. MATHEIN.

Witnesses:
A. B. DOBBS,
A. W. HOWARD.